US007022172B2

(12) United States Patent
Ohkawa et al.

(10) Patent No.: US 7,022,172 B2
(45) Date of Patent: Apr. 4, 2006

(54) NON-AQUEOUS INK COMPOSITION

(75) Inventors: Teruaki Ohkawa, Inashiki-gun (JP); Osamu Matsumoto, Inashiki-gun (JP)

(73) Assignee: Riso Kagaku Corporation, Tokyo (JP)

( * ) Notice: Subject to any disclaimer, the term of this patent is extended or adjusted under 35 U.S.C. 154(b) by 158 days.

(21) Appl. No.: 10/385,859

(22) Filed: Mar. 12, 2003

(65) Prior Publication Data

US 2003/0177948 A1 Sep. 25, 2003

(30) Foreign Application Priority Data

Mar. 12, 2002 (JP) ............................ 2002-066429

(51) Int. Cl.
*C09D 11/00* (2006.01)

(52) U.S. Cl. ................................ 106/31.86; 106/31.75

(58) Field of Classification Search ............ 106/31.86, 106/31.75
See application file for complete search history.

(56) References Cited

U.S. PATENT DOCUMENTS

| | | | | |
|---|---|---|---|---|
| 4,629,748 A | | 12/1986 | Miyajima et al. | |
| 4,822,417 A | * | 4/1989 | Kobayashi et al. | 524/308 |
| 4,822,418 A | * | 4/1989 | Lin et al. | 106/31.35 |
| 4,954,174 A | * | 9/1990 | Imagawa | 106/31.64 |
| 5,318,617 A | * | 6/1994 | Nagasawa et al. | 524/106 |
| 5,663,217 A | | 9/1997 | Kruse | |
| 5,849,814 A | | 12/1998 | Fujita | |
| 6,004,388 A | * | 12/1999 | Osada | 106/31.57 |
| 6,187,086 B1 | * | 2/2001 | Rehman | 106/31.86 |
| 6,786,956 B1 | * | 9/2004 | Ichikawa | 106/31.43 |
| 2002/0139280 A1 | * | 10/2002 | Ichikawa | 106/31.43 |
| 2003/0004225 A1 | * | 1/2003 | Sarma et al. | 523/160 |
| 2003/0005856 A1 | * | 1/2003 | Leu et al. | 106/31.67 |
| 2003/0134937 A1 | * | 7/2003 | Ichikawa et al. | 523/160 |
| 2003/0192453 A1 | * | 10/2003 | Ohkawa et al. | 106/31.57 |
| 2004/0150702 A1 | * | 8/2004 | Tsuyoshi et al. | 347/100 |
| 2004/0227799 A1 | * | 11/2004 | Ogawa et al. | 347/100 |

FOREIGN PATENT DOCUMENTS

| | | | | |
|---|---|---|---|---|
| EP | 0 878 517 A2 | | 11/1998 |
| JP | 57-10661 | | 1/1982 |
| JP | 11-279467 | | 10/1999 |
| WO | WO 97/15633 | * | 5/1997 |
| WO | WO 02/16516 A1 | | 2/2002 |
| WO | WO 02/098987 A2 | | 12/2002 |

OTHER PUBLICATIONS

Patent Abstract of Japan JP 08 231914 Sep. 10, 1996, Fujita.
Patent Abstract of Japan JP 06 287310 Oct. 11, 1994, Murakami.
European Search Report (Dated Apr. 7, 2003).
Text of First Office Action for corresponding Chinese Patent Application dated Jan. 22, 2005.

* cited by examiner

*Primary Examiner*—Helene Klemanski
(74) *Attorney, Agent, or Firm*—Nixon Peabody LLP; Donald R. Studebaker

(57) ABSTRACT

A non-aqueous ink composition includes pigment, solvent and dispersant. The dispersant has an ester structure and the solvent contains not smaller than 60% by weight polar organic solvent. The polar organic solvent contains not smaller than 10% by weight ester solvent.

14 Claims, No Drawings

NON-AQUEOUS INK COMPOSITION

BACKGROUND OF THE INVENTION

1. Field of the Invention

This invention relates to an ink composition for a printer, and more particularly to a non-aqueous ink composition containing therein non-volatile solvent as a main material.

2. Description of the Related Art

Ink jet recording has been rapidly put into wide use since it realizes high-speed printing with relatively less noise. In an ink jet printer, highly flowable liquid ink is injected onto a recording medium through a fine nozzle, and the ink jet printers are broadly divided into an on demand type and a continuous type.

Inks for ink jet printers are broadly divided into an aqueous type and a non-aqueous type. The aqueous type inks generally comprise water-soluble dye such as acid dye, direct dye and basic dye dissolved in glycol solvent and water, and there has been a problem that ink jet printings by an aqueous type ink are generally poor in resistance to water.

On the other hand, non-aqueous type inks are excellent in resistance to water. The non-aqueous type inks are broadly divided into solvent type inks and oil type inks. Especially, various kinds of oil type inks have been proposed since the oil type ink is advantageous as ink for high-speed ink jet printer in that it is less apt to cause clogging of the nozzle and requires less frequent cleaning during printing.

For example, in Japanese Unexamined Patent Publication No. 57(1982)-10661, there is disclosed on oil type ink in which specific dispersant and fine pigment particles are dispersed in non-aqueous solvent such as aliphatic or aromatic hydrocarbon series solvent, halogenated hydrocarbon series solvent, ether series solvent, ketone series solvent, ester series solvent, polyhydric alcohol or the like. However this ink is disadvantageous in that it is not sufficiently satisfactory in shelf stability and it is difficult to keep sufficient discharge stability unless the pigment particles are further atomized since the inner diameter of the nozzle becomes smaller in order to meet demand for higher resolution.

As an ink jet ink which is excellent in discharge stability from a nozzle, there has been disclosed, in Japanese Unexamined Patent Publication No. 11(1999)-279467, an ink which is 5 to 15 pcs in viscosity at 250° C. and in which organic pigment atomized by kneading a mixture of at least three components including organic pigment, water-soluble inorganic salt in an weight not lighter than three times the weight of the organic pigment and water-soluble solvent is dispersed in high-boiling solvent together with suitable dispersant.

However, though the ink jet ink disclosed in Japanese Unexamined Patent Publication No. 11(1999)-279467 is improved in some extent in resistance to clogging and/or ink discharge stability in the nozzle or in the ink supply path, it is not sufficiently satisfactory in shelf stability and agglomeration of pigment particles occurs with time, which result in deterioration in dispersion of pigment particles.

When shelf stability of ink is unsatisfactory, discharge of ink becomes instable and condensation of pigment particles in the ink becomes insufficient, which results in a drop out of a part of the image, blur of the image and/or an insufficient image density (especially a solid part of the image). Further, when ink stored for a long time is used, discharging conditions (e.g., the voltage to be applied to the ink jet), the rate at which the ink is condensed and the like can be different from when fresh ink is used, which means that the recorded images change with the state of storing the ink.

SUMMARY OF THE INVENTION

In view of the foregoing observations and description, the primary object of the present invention is to provide a non-aqueous ink composition which is excellent in shelf stability of ink.

In accordance with the present invention, there is provided a non-aqueous ink composition comprising pigment, solvent and dispersant, wherein the dispersant has an ester structure and the solvent contains therein not smaller than 60% by weight polar organic solvent which contains therein not smaller than 10% by weight ester solvent.

The polar organic solvent contains the ester solvent preferably in not smaller than 30% by weight, and more preferably in not smaller than 50% by weight. The entire polar organic solvent may be ester solvent.

The balance of the solvent may be, for instance, aliphatic solvent.

Preferably the dispersant has a polyester amine structure or a fatty amine structure.

It is preferred that the non-aqueous ink composition be 2 to 30 mPas in viscosity at 23° C.

The non-aqueous ink composition of the present invention may contain one or more components other than the pigment, solvent and dispersant, e.g., resin for fixing the pigment.

Dispersant is generally apt to be dissolved in polar organic solvent. Since the non-aqueous ink composition of the present invention contains polar organic solvent in an amount not smaller than 60% by weight of the solvent, the dispersant is stably dissolved in the ink composition and agglomeration of pigment particles is suppressed. Further, since in the non-aqueous ink composition of the present invention, the polar organic solvent contains not smaller than 10% by weight ester solvent, in which dispersant having an ester structure is especially apt to be dissolved, agglomeration of pigment particles is further suppressed and non-aqueous ink excellent in shelf stability can be obtained.

Further, since agglomeration of pigment particles is suppressed, discharge of ink is stabilized and the problems of a drop out of a part of the image, blur of the image, an insufficient image density can be avoided. Since the non-aqueous ink component of the present invention contains polar organic solvent in an amount not smaller than 60% by weight of the solvent, blur of an image on plain paper can be effectively suppressed. This is probably because plain paper has been sized (hydrophobic treatment) in order to prevent blur when written with an aqueous utensil such as an aqueous ball point pen or an aqueous fountain pen and ink containing a polar (hydrophilic) component is more advantageous than ink containing a non-polar (hydrophobic) component (e.g., aliphatic solvent) in suppressing blur or strike through.

Further, since the non-aqueous ink component of the present invention is excellent in shelf stability, discharging conditions hardly change even if the ink is used after long storage, and accordingly images obtained can be stabilized.

DETAILED DESCRIPTION OF THE INVENTION

In accordance with the present invention, there is provided a non-aqueous ink composition comprising pigment, solvent and dispersant, wherein the dispersant has an ester structure and the solvent contains therein not smaller than 60% by weight polar organic solvent which contains therein not smaller than 10% by weight ester solvent.

As the polar organic solvent, ester solvent, alcohol solvent, higher fatty acid solvent, ether solvent and a mixture of these solvents may be used. It is preferred that the polar organic solvent forms a single phase when mixed with solvent other than polar organic solvent.

For example, ester solvents such as methyl laurate, isopropyl laurate, isopropyl palmitate, isostearyl palmitate, methyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, di-isopropyl adipate, di-isopropyl sebacate, diethyl sebacate, propylene glycol monocaprate, trimethylolpropane tri-2-ethylhexanoate and glyceryl tri-2-ethylhexanoate; alcohol solvents such as isomyristyl alcohol, isopalmityl alcohol, isostearyl alcohol and oleyl alcohol; higher fatty acid solvents such as isononanoic acid, isomyristic acid, hexadecanoic acid, isopalmitic acid, oleic acid and isostearic acid; and ether solvents such as diethylene glycol monobutyl ether, ethylene glycol monobutyl ether, propylene glycol monobutyl ether, and propylene glycol dibutyl ether can be employed.

As the balance of the solvent, non-polar solvent such as aliphatic solvent and aromatic solvent can be employed. As the aliphatic solvent, for instance, Teclen N-16, Teclen N-20, Teclen N-22, Nisseki Naphthesol L, Nisseki Naphthesol M, Nisseki Naphthesol H, #0 Solvent L, #0 Solvent M, #0 Solvent H, Nisseki Isosol 300, Nisseki Isosol 400, AF-4, AF-5, AF-6 and AF-7 which are available from NIPPON OIL CORPORATION, and Isopar G, Isopar H, Isopar L, Isopar M, Exxo1D40, Exxo1D80, Exxo1D100, Exxo1D130 and Exxo1D140 which are available from Exxon may be suitably employed. As the aromatic solvent, for instance, Nisseki Leansol G (alkylbenzene) may be suitably employed.

As the dispersant, hydroxyl-group-containing carboxylate esters, salts of long-chain polyamino-amide and polymeric acid ester, salts of polymeric polycarboxylic acid, salts of long-chain polyamino-amide and polar acid ester, polymeric unsaturated acid ester, polymeric copolymer, denatured polyurethane, denatured polyacrylate, polyether-ester type anionic surface active agent, salts of formalin naphthalenesulfonate condensate, salts of formalin aromatic sulfonate condensate, polyoxyethylene alkylphosphoric acid ester, polyoxyethylene nonylphenyl ether, polyester polyamine, stearylamine acetate and the like may be used.

For example, "Anti-Terra-U" (polyamino-amide phosphate), "Anti-Terra-203/204" (polymeric polycarboxylate), "Disperbyk-101" (polyamino-amide phosphate and acid ester), "Disperbyk-107" (hydroxyl-group-containing carboxylate ester), "Disperbyk-110" (acid-radial-containing copolymer), "Disperbyk-130" (ployamide), "Disperbyk-161", "Disperbyk-162", "Disperbyk-163" "Disperbyk-164", "Disperbyk-165", "Disperbyk-166", "Disperbyk-170" (polymeric copolymer), "Disperbyk-400", "Bykumen" (polymeric unsaturated acid ester), "BYK-P104/P105" (polymeric unsaturated acid polycarboxylic acid), "BYK-P104S/240S" (polymeric unsaturated acid polycarboxylic acid and silicone), and "Lactimon" (long-chain amine, unsaturated acid polycarboxylic acid and silcone) which are available from BYK Chemie may be employed.

Further, "Efka 44", "Efka 46", "Efka 47", "Efka 48", "Efka 49", "Efka 54", "Efka 63", "Efka 64", "Efka 65", "Efka 66", "Efka 71", "Efka 701", "Efka 764", "Efka 766", "Efka Polymer 100" (denatured polyacrylate), "Efka Polymer 150" (denatured aliphatic polymer), "Efka Polymer 400", "Efka Polymer 401", "Efka Polymer 402", "Efka Polymer 403", "Efka Polymer 450", "Efka Polymer 451", "Efka Polymer 452", "Efka Polymer 453" (denatured polyacrylate), and "Efka Polymer 745" (copper phthalocyanine), which are available from EfkaCHEMICALS; "FlowrenTG-710" (urethane oligomer), "FlowrenDOPA-15B", (acryl oligomer), "FlowrenSH-290/SP1000", "Polyflow No. 50E", and "Polyflow No. 300" (acryl copolymer), which are available from Kyoei Kagaku; and "Disperlon KS-860", "Disperlon KS-873N", "Disperlon KS-874" (polymeric dispersant), #2150 (aliphatic polycarboxylic acid), "#7004" (polyether ester type), and "DA-703-50" (polyester acid amide-amine salt), which are available from Kusumoto Kasei, may be employed.

Further, "DEMOL RN", "DEMOL N" (sodium salt of formalin naphthalenesulfonate condensate), "DEMOL MS.C", "DEMOL SN-B" (sodium salt of formalin aromatic sulfonate condensate), "DEMOL EP", "HOMOGENOL-18" (polycarboxylic acid type polymer), "EMULGEN 920", "EMULGEN 930", "EMULGEN 931", "EMULGEN 935", "EMULGEN 950", "EMULGEN 985" (polyoxyethylene nonylphenyl ether), "Acetamine 24" (coconutamine acetate), and "Acetamine 86" (stearylamine acetate), which are available from Kao Corporation, "Solsperse 5000" (phthalocyanine ammonium), "Solsperse 13940" (polyester amine), "Solsperse 17000", "Solsperse 18000" (fatty acid amine), "Solsperse 22000", "Solsperse 24000", and "Solsperse 28000", which are available from AVECIA, and "Nikkol T-106" (polyoxyethylene sorbitanmonooleate), "MYS-IEX" (polyoxyethylene monostearate) and "Hexagline 4-0)" (hexaglyceryl tetraoleate), which are available from Nikko Chemical, may be employed.

Among combinations of these solvents and dispersants, combinations of ester solvents and dispersants having an ester structure (especially, dispersants having a polyesteramine structure or a fatty acid amine structure) are especially advantageous in that more stable dispersion can be obtained, that is, the pigment is finer particle size and the ink is small in particle size change and/or viscosity change when left to stand under high temperature. Though the ester solvent should be contained in an amount not smaller than 10% by weight of the polar organic solvent, it should be contained preferably in an amount not smaller than 30% by weight of the polar organic solvent, and more preferably in an amount not smaller than 50% by weight of the polar organic solvent in order to improve dispersion of the pigment in ink.

As the pigment, any of those known in the field of printing may be used irrespective of whether it is inorganic or organic. For example, carbon black, cadmium red, molybdenum red, chromium yellow, cadmium yellow, titanium yellow, chromium oxide, pirigian, cobalt green, ultramarine blue, Prussian blue, cobalt blue, azo-pigments, phthalocyanine pigments, quinacridone pigments, isoindolinone pigments, dioxazine pigments, vat pigments, perylene pigments, perinone pigments, thioindigo pigments, quinophthalon pigments and metal complex pigments may be employed.

The pigment may be used either alone or in suitable combinations but it is preferred that the pigment be contained from 0.01 to 20 mass % of the entire ink composition.

The ink composition of the present invention may be added with resin soluble to the aforesaid polar organic solvent in order to improve fixing of ink to a recording medium and/or to adjust spread of ink on a recording medium. For example, acrylic resins, styrene-acrylic resins, styrene-maleic resins, rosin resins, rosin ester resins, ethylene-vinyl acetate resins, petroleum resins, coumarone-indene resins, terpene phenol resins, phenol resins, urethane resins, melamine resins, urea resins, epoxy resins, cellulose resins, vinyl chloride acetate resins, xylene resins, alkydresins, aliphatic resins, butyral resins, maleic resins and fumaric resins may be employed.

The present invention will be described in detail with reference to embodiments, hereinbelow.

Embodiment 1 (emb 1)

42 parts by weight of ethyl oleate, 25 parts by weight of isostearyl alcohol and 20 parts by weight of naphthenic solvent (Nisseki AF-6) were mixed and 8 parts by weight of Solsperse 13940 (AVECIA) was dissolved in the mixture as dispersant. Then 5 parts by weight of carbon black (MA-8) was added to the resultant mixture and premixed. Then the resultant mixture was dispersed by bead mill with residence time of about 20 minutes, thereby obtaining ink.

Embodiments 2 to 6 (emb 2~emb 6)

Inks were obtained in the same manner as the embodiment 1 except that pigment, polar organic solvent, non-polar solvent and dispersant shown in the following table 1 were employed.

COMPARATIVE EXAMPLES 1 TO 8 (ce 1~8)

Inks were obtained in the same manner as the embodiment 1 except that pigment, polar organic solvent, non-polar solvent and dispersant shown in the following table 2 were employed.

(Evaluation)

<Shelf Stability>

Ink was left to stand in a sealed container for 6 months under 70° C., and thereafter the shelf stability was evaluated as follows on the basis of the measured values of changes of particle size and viscosity of the ink. The rates of change of particle size and viscosity of the ink were obtained according to the following formula.

$$(\text{value after 6 months} \times 100)/\text{initial vlue} - 100(\%)$$

The particle size of the ink was measured by the use of a Dynamic Light Scattering Particle Size Distribution LB-500 (Horiba Seisakusho), and the viscosity of the ink was measured by the use of HAAKE rheometer RS75.

◎: The rates of change of particle size and viscosity of the ink were both smaller than 5%.

○: The rate of change of particle size or viscosity of the ink were not smaller than 5% and smaller than 10%.

Δ: The rate of change of particle size or viscosity of the ink were not smaller than 10% and smaller than 20%.

x: The rate of change of particle size or viscosity of the ink were not smaller than 20%.

<Blur>

6 point characters were printed on plain paper (Riso thick type S: Riso Kagaku Corporation), and blur was visually evaluated as follows.

○: less blur

Δ: more blur x: much more blur

The result was as shown in the following tables 1 and 2.

TABLE 1

| | | | emb 1 | emb 2 | emb 3 | emb 4 | emb 5 | emb 6 |
|---|---|---|---|---|---|---|---|---|
| pigment | carbon black (Mitsubishi Kagaku MA-8) | | 5 | 5 | 5 | 5 | 5 | 5 |
| polar organic solvent | ethyl oleate (ester solvent) | | 42 | | | | | |
| | dipropylene glycol dibutyl ether (glycol ether solvent) | | | 38.3 | | 43 | | 20 |
| | dipropylene glycol monoethyl ether (glycol ether solvent) | | | | | | | 22.5 |
| | isomyristic acid (fatty acid) | | | | 38 | | | |
| | isopropyl oleate (ester solvent) | | | | | 12 | | |
| | soybean oil isobutyl (ester solvent) | | | 6.7 | | | 32 | 30 |
| | soybean oil methyl (ester solvent) | | | | 21 | | 30 | 12.5 |
| | isostearyl alcohol (alcohol solvent) | | 25 | 10 | | 5 | 10 | |
| non-polar solvent | Nisseki AF-6 (naphthenic solvent) | | 20 | 30 | 31 | 25 | 18 | |
| dispersant | solsperse 13940 | | 8 | 10 | | 10 | | 10 |
| | solsperse 18000 | | | | 5 | | | |
| | DA-70350 (Kusumoto Kasei) | | | | | 5 | | |
| | total | | 100 | 100 | 100 | 100 | 100 | 100 |
| % by weight of polar organic solvent to the overall weight of the solvent | | | 77 | 65 | 65 | 70 | 80 | 100 |
| % by weight of ester solvent to the overall weight of the solvent | | | 63 | 12 | 35 | 20 | 100 | 50 |
| evaluation | shelf stability | | ◎ | ○ | ◎ | ○ | ◎ | ◎ |
| | blur | | ○ | ○ | ○ | ○ | ○ | ○ |
| | viscosity | initial (mpas) | 12.2 | 8.9 | 14.9 | 8.4 | 10.1 | 9.5 |
| | | after 6 months (70° C.) (mPas) | 12.4 | 9.5 | 15 | 9.1 | 10.1 | 9.7 |
| | | rate of change (%) | 1.6 | 6.7 | 0.7 | 8.3 | 0.0 | 2.1 |
| | mean diameter | initial (nm) | 45.0 | 52.0 | 49.0 | 50.0 | 45.0 | 47.0 |
| | | after 6 months (70° C.) (nm) | 45.0 | 55.0 | 49.5 | 53.0 | 46.0 | 47.0 |
| | | rate of change (%) | 0.0 | 5.8 | 1.0 | 6.0 | 2.2 | 0.0 |

TABLE 2

| | | | ce 1 | ce 2 | ce 3 | ce 4 | ce 5 | ce 6 | ce 7 | ce 8 |
|---|---|---|---|---|---|---|---|---|---|---|
| pigment | carbon black (Mitsubishi Kagaku MA-8) | | 5 | 5 | 5 | 5 | 5 | 5 | 5 | 5 |
| polar organic solvent | ethylene glycol dibutyl ether (glycol ether solvent) | | | 30.6 | | | | 40 | | |
| | dipropylene glycol monoethyl ether (glycol ether solvent) | | | | 67 | 44 | | 34 | | |
| | diethylene glycol dibutyl ether (glycol ether solvent) | | 40 | | | | | | 23.7 | |
| | isomyristic acid (fatty acid) | | 17.6 | | | | | | | |
| | isopropyl oleate (ester solvent) | | 14.4 | | | 24 | | | | |
| | soybean oil isobutyl (ester solvent) | | | 7.7 | 5 | | 25.5 | | 1.3 | |
| | isostearyl alcohol (alcohol solvent) | | | | | | | 11 | | 25.5 |
| non-polar solvent | Nisseki teclenN-16 (naphthenic solvent) | | | | | | | | 60 | |
| | Nisseki AF-6 (naphthenic solvent) | | 18 | 46.7 | 13 | 17 | 59.5 | | | 59.5 |
| dispersant | solsperse 13940 | | | 10 | 10 | 10 | 10 | 10 | 10 | 10 |
| | DA-70350 (Kusumoto Kasei) | | | | | | | | | |
| | EMULGEN 920 (Kao Corp.) (polyoxyethylene nonylphenyl ether) | | 5 | | | | | | | |
| | total | | 100 | 100 | 100 | 100 | 100 | 100 | 100 | 100 |
| % by weight of polar organic solvent to the overall weight of the solvent | | | 80 | 45 | 70 | 80 | 30 | 100 | 30 | 30 |
| % by weight of ester solvent to the overall weight of the solvent | | | 20 | 20 | 7 | 8 | 100 | 0 | 5 | 0 |
| evaluation | shelf stability | | Δ | Δ | Δ | Δ | Δ | Δ | x | x |
| | blur | | ○ | Δ | ○ | ○ | Δ | ○ | Δ | Δ |
| | viscosity | initial (mPas) | 9.7 | 7.9 | 7.7 | 10.4 | 9.9 | 8.9 | 7.2 | 14 |
| | | after 6 months (70° C.) (mPas) | 11.2 | 9.3 | 9.1 | 12.3 | 11.6 | 10.4 | 14.6 | 22.3 |
| | | rate of change (%) | 15.5 | 17.7 | 18.2 | 18.3 | 17.2 | 16.9 | 102.8 | 59.3 |
| | mean diameter | initial (nm) | 44.0 | 39.0 | 44.0 | 50.0 | 36.0 | 39.0 | 68.0 | 56.0 |
| | | after 6 months (70° C.) (nm) | 51.0 | 45.0 | 50.0 | 56.0 | 41.0 | 45.0 | 159.0 | 89.0 |
| | | rate of change (%) | 15.9 | 15.4 | 13.6 | 12.0 | 13.9 | 15.4 | 133.8 | 58.9 |

Ink in accordance with the comparative example 1 where though the solvent contained 80% by weight polar organic solvent and 20% by weight of the polar organic solvent was ester solvent, the dispersant was ether dispersant not having an ester structure was unsatisfactory in shelf stability. Inks in accordance with the comparative examples 2 and 5 where though not smaller than 10% by weight of the polar organic solvent was ester solvent and the dispersant had an ester structure, the amount of the polar organic solvent was smaller than 60% by weight of the solvent were unsatisfactory in shelf stability and not good in blur. Inks in accordance with the comparative examples 3, 4 and 6 where though the dispersant had an ester structure and the amount of the polar organic solvent was not smaller than 60% by weight of the solvent, the amount of the ester solvent was smaller than 10% by weight of the polar organic solvent (the comparative example 6 contained no ester solvent) were unsatisfactory in shelf stability. Inks in accordance with the comparative examples 7 and 8 where though the dispersant had an ester structure, the amount of the ester solvent was smaller than 10% by weight of the polar organic solvent (the comparative example 8 contained no ester solvent) and the amount of the polar organic solvent was smaller than 60% by weight of the solvent were unsatisfactory in shelf stability and not good in blur. Whereas, inks in accordance with the embodiments 1 to 6 were all satisfactory in shelf stability and all good in blur.

As can be understood from description above, in the non-aqueous ink composition of the present invention where not smaller than 60% by weight of the solvent is polar organic solvent and the polar organic solvent contains therein at least 10% by weight ester solvent, the dispersant is well dissolved in the ink and agglomeration of the pigment can be suppressed, whereby an ink which is excellent in shelf stability and less generates blur can be obtained.

What is claimed is:

1. A non-aqueous ink composition comprising pigment, a solvent mixture and a dispersant, wherein the dispersant has an ester structure and the solvent mixture contains therein at least one polar organic solvent in an amount not smaller than 60% by weight based on the total weight of the solvent mixture, said at least one polar organic solvent containing therein an ester solvent in an amount not smaller than 10% by weight based on the total weight of said at least one polar organic solvent;

wherein said ink composition has a viscosity of 2 to 30 mPas at 23° C.; and wherein the solvent mixture contains therein an aliphatic solvent.

2. A non-aqueous ink composition as defined in claim 1 in which the amount of said ester solvent contained in said at least one polar organic solvent is not smaller than 30% by weight based on the total weight of said at least one polar organic solvent.

3. A non-aqueous ink composition as defined in claim 2 in which the amount of said ester solvent contained in said at least one polar organic solvent is not smaller than 50% by weight based on the total weight of said at least one polar organic solvent.

4. A non-aqueous ink composition as defined in claim 1 in which the dispersant has a polyester amine structure.

5. A non-aqueous ink composition as defined in claim 1 in which the dispersant has a fatty amine structure.

6. A non-aqueous ink composition as defined in claim 1 further comprising a resin for fixing the pigment.

7. A non-aqueous ink composition as defined in claim 1, wherein the ester solvent is selected from the group consisting of methyl laurate, isopropyl laurate, isopropyl palmitate, isostearyl palmitate, methyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, di-isopropyl adipate, di-isopropyl sebacate, diethyl sebacate, propylene glycol monocaprate, trimethylolpropane tri-2-ethylhexanoate, glyceryl tri-2-ethylhexanoate and combinations thereof.

8. A non-aqueous ink composition as defined in claim 1 in which the solvent mixture contains aromatic solvent.

9. A non-aqueous ink composition as defined in claim 1, wherein the dispersant is selected from the group consisting of hydroxyl-group-containing carboxylate esters, salts of long-chain polyamino-amide and polymeric acid ester, salts of polymeric polycarboxylic acid, salts of long-chain polyamino-amide and polar acid ester, polymeric unsaturated acid ester, polymeric copolymer, denatured polyurethane, denatured polyacrylate, polyether-ester type anionic surface active agent, salts of formalin naphthalenesulfonate condensate, salts of formalin aromatic sulfonate condensate, polyoxyethylene alkylphosphoric acid ester, polyoxyethylene nonylphenyl ether, polyester polyamine, stearylamine acetate, and combinations thereof.

10. A non-aqueous ink composition as defined in claim 1, further comprising a resin soluble with the at least one polar organic solvent to improve fixing of the ink.

11. A non-aqueous ink composition, comprising:

a pigment;

a solvent mixture, the solvent mixture comprising at least one polar organic solvent and a non-polar organic solvent with the at least one polar organic solvent containing an ester solvent, a dispersant having an ester structure; and a resin soluble with the polar organic solvent;

wherein the polar organic solvent is 60% or greater by weight based on the total weight of the solvent mixture, the ester solvent is 10% or greater by weight based on the total weight of said polar organic solvent; and the solvent mixture contains therein an aliphatic solvent.

12. A non-aqueous ink composition as defined in claim 11, wherein the ester solvent is selected from the group consisting of methyl laurate, isopropyl laurate, isopropyl palmitate, isostearyl palmitate, methyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, di-isopropyl adipate, di-isopropyl sebacate, diethyl sebacate, propylene glycol monocaprate, trimethylolpropane tri-2-ethylhexanoate, glyceryl tri-2-ethylhexanoate and combinations thereof.

13. A non-aqueous ink composition as defined in claim 11, wherein the dispersant has a polyester amine structure.

14. A non-aqueous ink composition as defined in claim 11, wherein the dispersant has a fatty amine structure.

* * * * *

UNITED STATES PATENT AND TRADEMARK OFFICE

CERTIFICATE OF CORRECTION

PATENT NO. : 7,022,172 B2
APPLICATION NO. : 10/385859
DATED : April 4, 2006
INVENTOR(S) : Teruaki Ohkawa et al.

It is certified that error appears in the above-identified patent and that said Letters Patent is hereby corrected as shown below:

In the Specifications:

Col. 6, line 32, insert in place of Table 1 the following:

TABLE 1

| | | | emb 1 | emb 2 | emb 3 | emb 4 | emb 5 | emb 6 |
|---|---|---|---|---|---|---|---|---|
| pigment | carbon black (Mitsubishi Kagaku MA-8) | | 5 | 5 | 5 | 5 | 5 | 5 |
| polar organic solvent | ethyl oleate (ester solvent) | | 42 | | | | | |
| | dipropylene glycol dibutyl ether (glycol ether solvent) | | | 38.3 | | 43 | | 20 |
| | dipropylene glycol monoethyl ether (glycol ether solvent) | | | | | | | 22.5 |
| | isomyristic acid (fatty acid) | | | | 38 | | | |
| | isopropyl oleate (ester solvent) | | | | | 12 | | |
| | soybean oil isobutyl (ester solvent) | | | 6.7 | | | 32 | 30 |
| | soybean oil methyl (ester solvent) | | | | 21 | | 30 | 12.5 |
| | isostearyl alcohol (alcohol solvent) | | 25 | 10 | | 5 | 10 | |
| non polar solvent | Nisseki AF-6 (naphthenic solvent) | | 20 | 30 | 31 | 25 | 18 | |
| dispersant | solsperse 13940 | | 8 | 10 | | 10 | | 10 |
| | solsperse 18000 | | | | 5 | | | |
| | DA-70350 (Kusumoto Kasei) | | | | | | 5 | |
| | total | | 100 | 100 | 100 | 100 | 100 | 100 |
| % by weight of polar organic solvent to the overall weight of the solvent | | | 77 | 65 | 65 | 70 | 80 | 100 |
| % by weight of ester solvent to the overall weight of the solvent | | | 63 | 12 | 35 | 20 | 100 | 50 |
| evaluation | shelf stability | | ◎ | ○ | ◎ | ○ | ◎ | ◎ |
| | blur | | ○ | ○ | ○ | ○ | ○ | ○ |
| | viscosity | initial (mpas) | 12.2 | 8.9 | 14.9 | 8.4 | 10.1 | 9.5 |
| | | after 6 months (70° C.) (mPas) | 12.4 | 9.5 | 15 | 9.1 | 10.1 | 9.7 |
| | | rate of change (%) | 1.6 | 6.7 | 0.7 | 8.3 | 0.0 | 2.1 |
| | mean diameter | initial (nm) | 45.0 | 52.0 | 49.0 | 50.0 | 45.0 | 47.0 |
| | | after 6 months (70° C.) (nm) | 45.0 | 55.0 | 49.5 | 53.0 | 46.0 | 47.0 |
| | | rate of change (%) | 0.0 | 5.8 | 1.0 | 6.0 | 2.2 | 0.0 |

-- --

Signed and Sealed this
Fourth Day of June, 2013

Teresa Stanek Rea
*Acting Director of the United States Patent and Trademark Office*